(12) United States Patent
Merkel et al.

(10) Patent No.: US 11,443,551 B2
(45) Date of Patent: Sep. 13, 2022

(54) FACIAL RECOGNITIONS BASED ON CONTEXTUAL INFORMATION

(71) Applicant: Hewlett-Packard Development Company, L.P., Spring, TX (US)

(72) Inventors: Harold Merkel, Houston, TX (US); Qian Lin, Palo Alto, CA (US); Guoxing Yang, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/612,782

(22) PCT Filed: Oct. 24, 2017

(86) PCT No.: PCT/US2017/058041
§ 371 (c)(1),
(2) Date: Nov. 12, 2019

(87) PCT Pub. No.: WO2019/083508
PCT Pub. Date: May 2, 2019

(65) Prior Publication Data
US 2020/0257889 A1    Aug. 13, 2020

(51) Int. Cl.
*G06V 40/16* (2022.01)
*G06T 7/55* (2017.01)
(Continued)

(52) U.S. Cl.
CPC .......... *G06V 40/168* (2022.01); *G06F 16/535* (2019.01); *G06T 7/55* (2017.01);
(Continued)

(58) Field of Classification Search
CPC ............ G06K 9/00221; G06K 9/00362; G06T 2207/30201; G06T 7/55;
(Continued)

(56) References Cited

U.S. PATENT DOCUMENTS 8,311,292 B2    11/2012 Tian et al.
2007/0174272 A1    7/2007 Carter et al.
(Continued)

FOREIGN PATENT DOCUMENTS

WO    WO-2016190814 A1    12/2016

OTHER PUBLICATIONS

Affandi, Adnon et al. "RFID and Face Recognition Based Security and Access Control System" Int'l Journal of Innovative Research in Science . . . 2, No. 11 (2013): 5955-5964.
Khattak, Asad Masood et al. "Context Representation and Fusion: Advancements and Opportunities," Sensors 14, No. 6 (2014): 9628-9668.

*Primary Examiner* — Kenny A Cese
(74) *Attorney, Agent, or Firm* — Tong Rea Bentley & Kim LLC (57) ABSTRACT

In example implementations, a method is provided. The method may be executed by a processor. The method includes receiving an image. The image is analyzed to obtain facial features. Contextual information is obtained and a vector including a facial feature class of the facial features and contextual feature classes of the contextual information is generated. A facial recognition is then performed based on the vector.

14 Claims, 4 Drawing Sheets

(51) Int. Cl.
  *G06F 16/535* (2019.01)
  *G06V 10/44* (2022.01)
  *G06V 40/10* (2022.01)
(52) U.S. Cl.
  CPC .......... *G06V 10/443* (2022.01); *G06V 40/103* (2022.01); *G06V 40/172* (2022.01); *G06T 2207/10024* (2013.01); *G06T 2207/10028* (2013.01); *G06T 2207/30201* (2013.01)
(58) Field of Classification Search
  CPC .......... G06T 2207/10024; G06T 2207/10028; G06V 40/168; G06V 10/443; G06V 40/172; G06V 40/103; G06F 16/535
  See application file for complete search history.

(56) References Cited

U.S. PATENT DOCUMENTS

| | | | |
|---|---|---|---|
| 2010/0303289 A1* | 12/2010 | Polzin | A63F 13/428 |
| | | | 382/103 |
| 2011/0038512 A1* | 2/2011 | Petrou | G06F 16/532 |
| | | | 382/118 |
| 2011/0047384 A1 | 2/2011 | Jacobs et al. | |
| 2016/0292494 A1* | 10/2016 | Ganong | G06V 40/172 |
| 2016/0328601 A1* | 11/2016 | Ming | G06K 9/00281 |
| 2017/0061200 A1 | 3/2017 | Wexler et al. | |
| 2017/0083753 A1* | 3/2017 | Friedland | G06K 9/00973 |
| 2017/0116466 A1 | 4/2017 | Resnick et al. | |
| 2019/0095465 A1* | 3/2019 | Zhai | G06K 9/6215 |

* cited by examiner

FACIAL RECOGNITIONS BASED ON CONTEXTUAL INFORMATION

BACKGROUND

Facial recognition can be used for a variety of different applications, such as person identification, security, and like. For example, cameras may be set up at entrances to a room or building and capture images. The images can be used to perform facial recognition. For example, access to a building or a room can be granted or denied based on whether or not the facial recognition is successful.

DETAILED DESCRIPTION

Examples described herein provide an apparatus and a method for performing a facial recognition based on contextual information. As discussed above, facial recognition can be used for a variety of different applications, such as person identification, security, and the like. Current facial recognition processes may be inefficient.

Examples described herein provide an improved facial recognition method that uses contextual information. The contextual information can be combined with facial features obtained from a facial image to generate a vector of features. The features may be divided into feature classes such as a facial feature class and contextual feature classes.

The feature classes of the vector may be applied in a variety of different ways to improve the facial recognition process. For example, the feature classes can be used to filter images in a database to a subset of images to reduce the number of images used for the facial recognition process, or to improve the accuracy of the facial recognition process by comparing the feature classes in the vector to respective feature classes of respective vectors associated with each image in a database.

Figure 1:
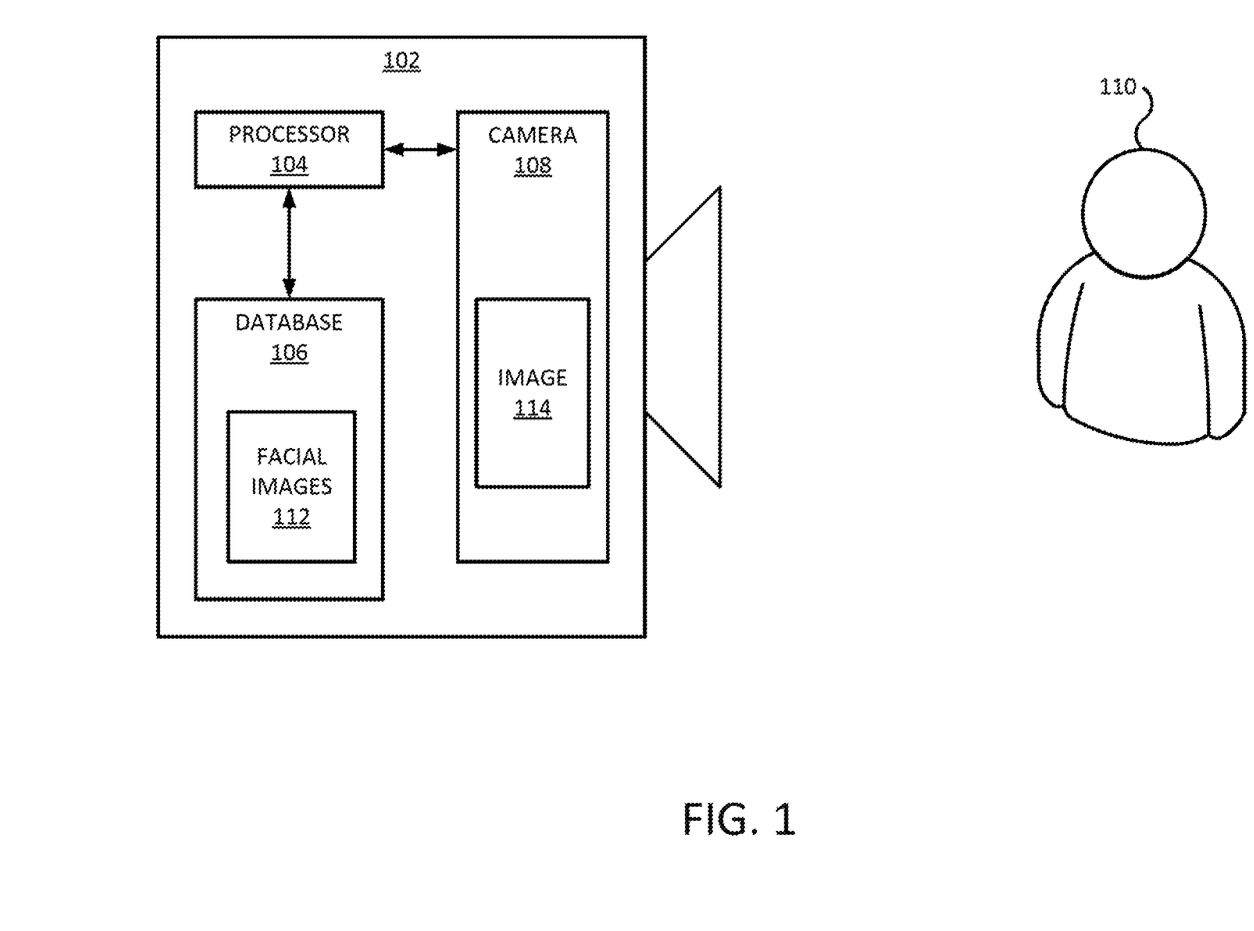
FIG. 1 is a block diagram of an example facial recognition apparatus of the present disclosure.

FIG. 1 illustrates a block diagram of a facial recognition apparatus 102. In one example, the apparatus 102 may include a processor 104, a camera 108, and a database (DB) 106. The processor 104 may be communicatively coupled to the camera 108 and the DB 106.

In one example, the camera 108 may be used to capture an image 114. The image 114 may be a facial image or a whole body image from which the facial image may be obtained. The camera 108 may be multiple cameras. For example, a red, green, blue (RGB) camera and a depth sensing camera may be deployed within the apparatus 102. The RGB camera may be used to capture a first image such as a facial image and the depth sensing camera may be used to capture a second image such as a whole body image.

In another example, the camera 108 may be a single camera (e.g., an RGB camera) that can be used to capture the facial image and/or the whole body image. For example, a single image of the whole body of a person 110 may be captured. The single image may be analyzed and processed to obtain the facial image and the whole body image.

In one example, the DB 106 may be stored on a non-transitory computer readable medium (e.g., a local hard disk drive, a random access memory (RAM), and the like). The DB 106 may include a plurality of facial images 112 that can be used to perform a facial recognition of the person 110 and to verify the identity of the person 110.

In on example, the plurality of facial images 112 may be captured and stored during a registration phase. For example, individuals of a corporation, a university, a private club, a government branch, and the like, may be asked to have a facial image captured for facial recognition and identification. During the registration phase, contextual information may associated with each facial image 112. The contextual information may include facial and body attributes, such as an estimated height, an estimated weight, a hair color, an eye color, a hair style (e.g., long hair, bald, short hair), gender, ethnicity, location information such as a city, a building, a floor, or an office room number, organizational information such as a manager, colleagues, or a reporting chain. Registration may also include links to information which changes dynamically, such as calendar information, access event information, and the like.

In one example, the estimated height, the estimated weight, the hair color, the eye color, the hair style, and the like may be obtained based on analysis of a whole body image. The calendar information may include the calendar information for those individuals who have facial images registered. For example, the calendar information may include a location, a room number, a building number, a time, a date, and the like. The calendar information may help provide contextual information for where a person is supposed be located at a particular time.

The organizational proximity may refer to individuals or employees who are within the same group of an organization. For example, a meeting may be for accountants. Thus, if the facial image 114 of the person 110 is captured during entrance to an accounting meeting, the organizational proximity of the employees associated with the facial images 112 may be used as contextual information to help improve the facial recognition process.

The access event information may include information related to access events that are recorded at the location. For example, the access events may include an access card swipe to enter the building of the location, a remote device that has logged into an Internet Protocol (IP) address at the location, and the like. Thus, if the facial image 114 of the person 110 is captured during entrance to a meeting at a particular location, the access event information of the employees associated with the facial images 112 may be used as contextual information to help improve the facial recognition process.

As noted above, the contextual information may help improve the facial recognition process. For example, a facial image 114 captured by the camera 108 may match multiple facial images 112 in the database 106. However, the contextual information may indicate that the person 110 associated with the facial image 114 is located at meeting room 100 at noon on Jul. 17, 2017. The contextual information associated with one of the possibly matching facial images 112 indicates that the person is supposed to be in meeting room 100 at noon on Jul. 17, 2017. As a result, the contextual information may help match a facial image 112 to the facial image 114 of the person 110.

Figure 2:
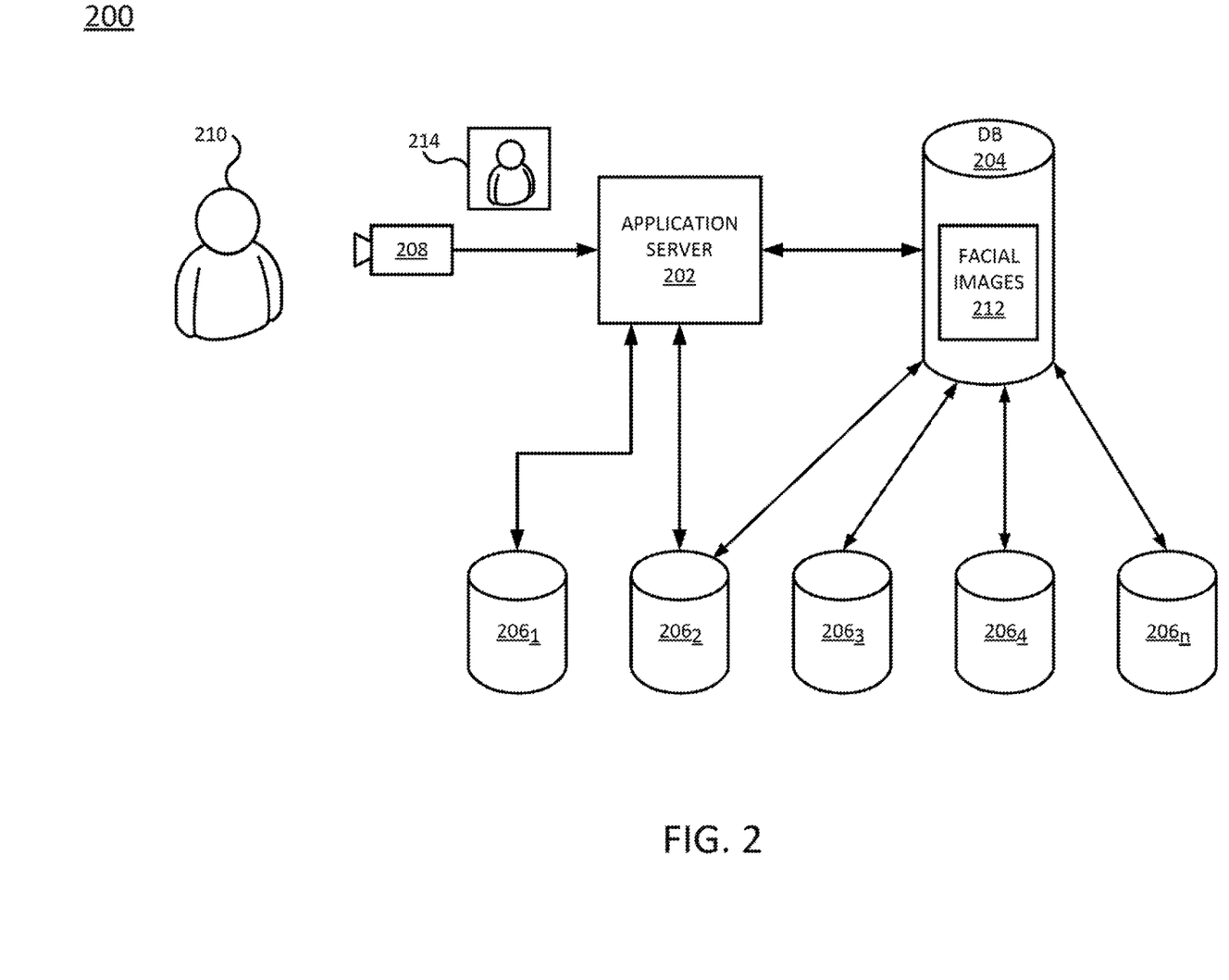
FIG. 2 is another block diagram of an example facial recognition system of the present disclosure.

The facial recognition apparatus 102 may be used to perform the facial recognition process as discussed in further detail below. FIG. 2 illustrates another example of a system 200 for performing a facial recognition process. In one example, the system 200 may include an application server 202, a database 204, a plurality of databases $206_1$ to $206_n$ (hereinafter referred to individually as a database 206 or collectively as databases 206), and a camera 208. The system 200 may be deployed in a room or a location in a building (e.g., a conference room).

In one example, the application server 202 may include a processor and a memory to perform the functions described herein. In one example, the database 204 may be a database server that also includes a processor and memory. The database 204 may include a plurality of facial images 212 that are used to perform the facial recognition process.

In one example, as noted above, the facial recognition apparatus 102 may be used to perform the facial recognition process. In such an example, the camera 208 and the application server 202 may be replaced with the facial recognition apparatus 102.

Referring back to FIG. 2, in one example, the plurality of databases 206 may contain different types of contextual information. Some of the databases 206 may contain dynamic contextual information that can change over time and other databases 206 may contain static contextual information that does not change, or changes infrequently, over time. For example, the database $206_1$ may store room and location information associated with a room that the system 200 is located in. The database $206_2$ may store calendar data. The database $206_3$ may store access event data. The database $206_4$ may store facial features for each facial image 212 that was generated during the registration phase, similar to the facial images 112 described in FIG. 1. The database $206_n$ may include human resource data for each person associated with the facial images 212 (e.g., a height, weight, hair color, organizational position, department, or group, and the like). Additional databases 206 may include other types of contextual information.

The room and location information, the facial features and the HR data may be considered as static contextual data. The calendar data and the access event data may be considered as dynamic contextual data.

In one example, the application server 202 may be communicatively coupled, via a wired or a wireless connection, to the database 204, to at least one of the databases 206 and to the camera 208. The database 204 may also be communicatively coupled to at least one of the databases 206 via a wired or a wireless connection. Thus, the application server 202 and the database 204 may access or obtain contextual information stored in the databases 206.

In one example, the camera 208 may be located at an entrance to a room and may capture a facial image 214 of a person 210. The facial image 214 may be transmitted to the application server 202. The application server 202 may analyze the facial image 214 to obtain facial features. Any facial feature extraction method may be used. For example, landmarks of the facial image 214 may be detected based on training images or training models. The landmarks may represent eyes, a nose, a mouth, ears, and the like. The facial features may represent a size of the landmark, a distance between landmarks, or a ratio of sizes of landmarks relative to other landmarks or distances between landmarks relative to other distances between landmarks.

In one example, the camera 208, or a second additional camera, may capture a whole body image. The whole body image may be analyzed to obtain body features. The body features may include a height, an estimated weight, a hair color or style, and the like.

In one example, the application server 202 may obtain contextual information. For example, the application server 202 may obtain room and location information from the database $206_1$ and calendar data from the database $206_2$.

The application server 202 may then generate a vector of features. The vector of features may be organized as groups of features that may be different classes of features. For example, one class of features may be a facial feature class and a second class of features may be a contextual feature class. In one example, the contextual feature class may comprise a plurality of different contextual feature classes. For example, the contextual feature classes may include a body features class, a calendar feature class, an organization feature class, an access event feature class, and the like.

For example, for the facial image 214 a vector of $\{(F_1, \ldots, F_n)(B_1, \ldots, B_n)(C_1, \ldots, C_n)(O_1, \ldots, O_n)(A_1, \ldots, A_2)\}$ may be created. The class $(F_1, \ldots, F_n)$ may be the facial feature class, and the classes $(B_1, \ldots, B_n)$, $(O_1, \ldots, O_n)$, and $(A_1, \ldots, A_2)$ may be the contextual feature classes. For example, $(B_1, \ldots, B_n)$ may be the body feature class, $(C_1, \ldots, C_n)$ may be the calendar feature class, $(O_1, \ldots, O_n)$ may be the organizational feature class, and $(A_1, \ldots, A_2)$ may be the access event feature class.

In one example, each feature class may be pre-defined. For example, the application server 202 may know that the first 100 values are the facial feature class, the next 100 values are the body feature class, the next 3 values are the calendar feature class, and so forth. Each feature within each class may be represented by a value of an associated feature. For example, the facial feature class may be trained by a convolutional neural network. Thus, the facial feature class $(F_1, \ldots, F_n)$ may include 100 values $F_1$-$F_{100}$.

In one example, some of the feature classes may include a single value. For example, the organizational feature class may have a single value for a value assigned to a group that an employee is associated with. Thus, the organization feature class may include a single value $O_1$. It should be noted that the above are provided as examples, and the vector may include the facial feature class and any number of the contextual feature classes. In other words, other contextual feature classes may be added to the vector or some contextual feature classes may be removed and not used.

The application server 202 may then perform a facial recognition process based on the vector. In one example, the application server 202 may access the database 204 to obtain the respective vectors for each one of the facial images 212 to perform the facial recognition process.

In one example, when the request is received by the database 204 from the application server 202, the database 204 may access some of the databases 206 to update values of contextual feature classes that may contain dynamic contextual information. For example, the database 204 may access the calendar data in the database $206_2$ and the access event data stored in the database $206_3$. In another example, the dynamic contextual information may be pushed to the database 204 whenever the values change. The facial feature class values and the body feature class values may be obtained previously from the database $206_4$ and $206_n$, respectively. As a result, each facial image 212 may have a respective vector that includes a facial feature class and contextual feature classes.

The facial recognition process may then be performed by the application server 202 by comparing a vector generated for the facial image 214 with the respective vector for each one of the facial images 212. In one example, the facial recognition process may assign a value of 1 for a feature that matches and a value of 0 for a feature that does not match. A total score for matching features may be calculated. For example, the vector for the facial image 214 may be {(10, 5, 7, 25)(10, 60, 150)(1, 10:00)(8)(100, 9:58)}. The respective vector for a facial image 212 {(10, 6, 7, 25)(9, 60, 150)(1, 10:00)(8)(100, 9:58)}. The total score for the vector of the image 214 compared to the respective vector for the facial image 212 may be 10 (e.g., 10 features match and are assigned a value of 1 for matching). The above is one scoring example and it should be noted that other types of scoring methods using the vectors may be deployed. The respective vector that has a highest total match score to the vector of the facial image 214 may be identified as a match to identify the person 210 in the facial image 214.

In one example, the facial recognition process may be performed by comparing the vector of the facial image 214 with the respective vectors of each one of the facial images 212. In another example, a weighting process may be used for the facial recognition process. The weighting process may be represented as $w_1$ (facial feature class) (e.g., $(F_1, \ldots, F_n))+w_2$ (contextual feature classes)(e.g., $(B_1, \ldots, B_n)(C_1, \ldots, C_n)(O_1, \ldots, O_n)(A_1, \ldots, A_2)$).

For example, the facial feature class may be assigned a first weight value (e.g., $w_1$) and the contextual feature classes may be assigned a second weight value (e.g., $w_2$). The first weight value and the second weight value may sum to equal a value of one. In some instances the facial features may be more important and be assigned a higher weight value than the contextual feature classes, or vice versa.

In one example, the vector may be used to filter the plurality of facial images 212 into a smaller subset of images. For example, there may be 100,000 facial images for each one of 100,000 employees of a corporation. The vector may be used to reduce the 100,000 facial images down to a subset of 10,000 facial images for the facial recognition process.

In one example, the contextual feature classes may be used to perform the filtering. For example, the 100,000 facial images may be reduced down to 10,000 facial images based on the contextual feature classes of the respective vectors of the images 212 that match the contextual feature classes of the vector of the image 214.

After the plurality of facial images 212 is filtered into a smaller subset of images, the facial feature class may be used to perform the facial recognition process. For example, the facial feature class of the vector generated for the facial image 214 may be compared to the facial feature class of the respective vector of the remaining 10,000 facial images. As a result, the speed and efficiency of the facial recognition process may be removed.

In one example, the contextual feature classes may be used in an iterative facial recognition process. For example, feedback from a previous iteration may be used to determine which contextual feature classes may be used for subsequent iterations. For example, on a first run the facial feature class and the body feature class may be used for the facial recognition process. If multiple matches are found, a second iteration may be performed by adding an additional contextual feature class. For example, the second iteration may use the facial feature class, the body feature class, and the calendar feature class. The process may be iteratively repeated until a single match is found.

In one example, the facial feature class and all of the contextual feature classes may be used to perform the facial recognition process. However, no matches may be found. As a result, an iterative facial recognition process may be used to remove a contextual feature class until a match is found. For example, a second iteration may remove the organizational feature class from the vector and repeat the facial recognition process. If not match is found, the third iteration may remove the access event feature class from the vector, and so forth.

In one example, the facial recognition process may be repeated for each person 210 who enters the location. Thus, if twenty people enter the room, then twenty facial images 214 would be captured. A vector would be generated for each one of the twenty facial images 214 and the facial recognition process may be repeated based on the vector for each one of the twenty facial images 214.

In one example, when the vector is used to perform filtering, as described above, a facial image 212 that is determined to match the facial image 214 may be removed from the subset of facial images for a subsequent performance of the facial recognition process. For example, the subset of facial images may include twenty facial images down from a total of 10,000 images using the contextual feature classes. A first facial image may be captured for a first person and the facial recognition process may be performed, as discussed above. The facial image that matches the first facial image may be removed from the subset of twenty facial images. As a result, the subset of facial images may include nineteen facial images for performing the facial recognition process on a second facial image of a second person who enters the room.

In one example, the facial recognition system 200 may be deployed at a location such as a meeting room, as noted above. The location may include meeting room devices such as a projector, video conferencing monitors, an audio conferencing device, and the like. The meeting room devices may be communicatively coupled to the application server 202. In one example, the application server 202 may control operation of the meeting room devices based on a successful or positive identification (e.g., the facial image 214 of the person 210 entering the location matches a facial image of the plurality of facial images 212) of a person who enters the location using the facial recognition process described above.

For example, the facial recognition system 200 may be deployed to identify people 210 who enter the location using the facial recognition process described above. In one example, after the people 210 are identified, the facial recognition system 200 may automatically activate at least one of the meeting room devices. For example, when the people 210 are positively identified, the application server 202 may activate the projector, initiate a video conference with remote attendees via the video conferencing monitors, and dial a conference bridge telephone number via the audio conferencing device.

Thus, the facial recognition system 200 provides an improved facial recognition process using a vector that is generated based off of feature classes such as a facial feature class and contextual feature classes. The use of the contextual feature classes improves the accuracy and efficiency of the facial recognition process.

Figure 3:
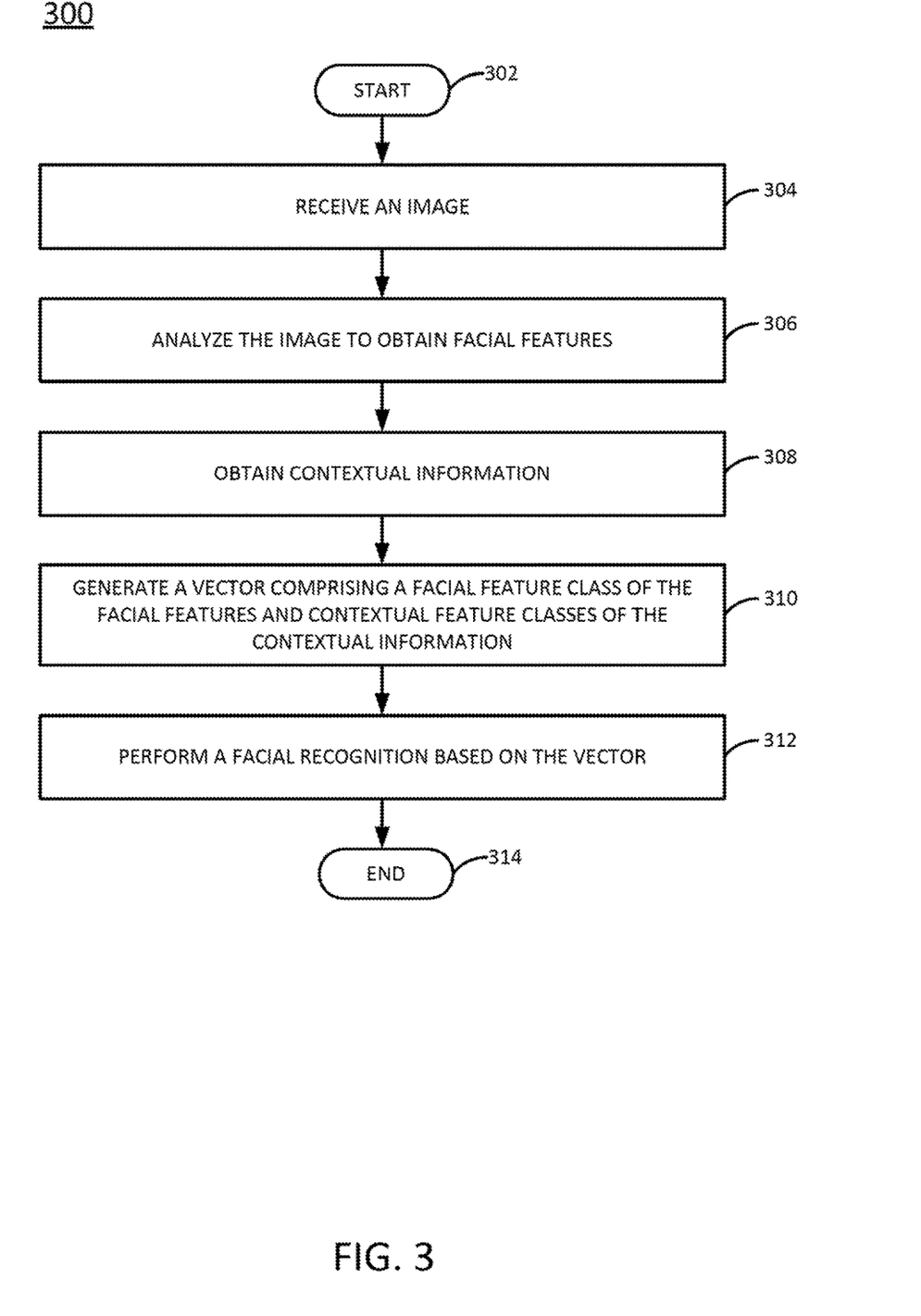
FIG. 3 is a flow chart of an example method for performing a facial recognition.

FIG. 3 illustrates a flow diagram of an example method 300 for performing a facial recognition. In one example, the method 300 may be performed by the facial recognition apparatus 102 or the application server 202.

At block 302, the method 300 begins. At block 304, the method 300 receives an image. In one example, the image may be a facial image. In another example, the image may be a whole body image from which the facial image can be obtained.

In one example, the image may include multiple images. For example, a facial image may be captured by a first camera at an entrance to a location and a whole body image may be captured by a second camera located at the location.

At block 306, the method 300 analyzes the image to obtain facial features. Digital image analysis techniques may be applied to the image to obtain the facial features, as described above.

At block 308, the method 300 obtains contextual information. For example, different databases may store different contextual information. The contextual information may include information such as an estimated height, an estimated weight, a hair color, an eye color, a hair style (e.g., long hair, bald, short hair), calendar information, access event information, and the like.

At block 310, the method 300 generates a vector comprising a facial feature class of the facial features and contextual feature classes of the contextual information. The facial feature class may include a value for each facial feature that is used. The contextual feature classes may include a value for each contextual feature that is used.

In one example, the contextual feature classes may include different contextual feature classes. For example, contextual feature classes may comprise a body feature class, a calendar feature class, an organizational feature class, an access event feature class, and the like.

At block 312, the method 300 performs a facial recognition based on the vector. For example, the vector may be compared to respective vectors of each facial image stored in a database. In one example, a match score may be calculated based on the comparison of each feature in the facial feature class and contextual feature classes of the vector and each feature in the facial feature class and contextual feature classes of the respective vector for each facial image stored in the database.

In one example, a weight value may be applied. For example, a first weight value may be applied to the facial feature classes and a second weight value may be applied to the contextual feature classes.

In another example, the facial images stored in a database may be filtered to reduce the facial images into a subset of the facial images using the vector. For example, the contextual feature classes of the vector may be used to filter the facial images into a subset of facial images that includes a smaller number of facial images used for comparison. The facial feature class of the vector may then be used to perform the facial recognition process against the facial feature class of the respective vectors of the subset of facial images.

In one example, the method 300 may be repeated for each person who enters a particular location. The speed and efficiency can be further improved as the image of the person who is identified may be removed from the subset of images used for identifying subsequent people who enter the location.

In one example, after the facial recognition is performed successfully, a meeting room device may be activated in response to the successful facial recognition. For example, the meeting room device may be a display device, a communication device, and the like. Activating the device may include powering on the device, initiating a communication path with the communication device, and the like. At block 314, the method 300 ends.

Figure 4:
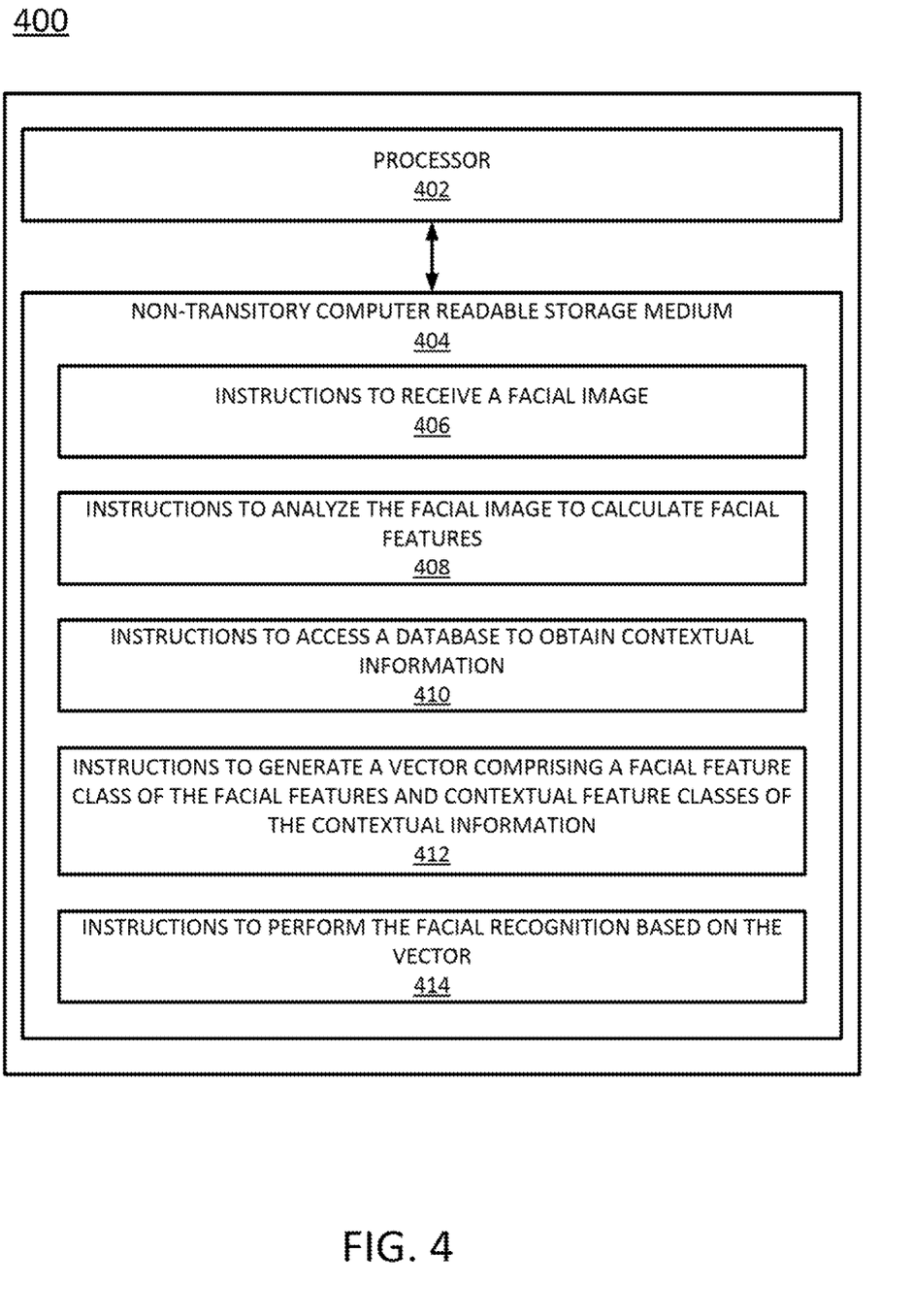
FIG. 4 is a block diagram of an example non-transitory computer readable storage medium storing instructions executed by a processor.

FIG. 4 illustrates an example of an apparatus 400. In one example, the apparatus 400 may be the facial recognition apparatus 102 or the AS 202. In one example, the apparatus 400 may include a processor 402 and a non-transitory computer readable storage medium 404. The non-transitory computer readable storage medium 404 may include instructions 406, 408, 410, 412 and 414 that, when executed by the processor 402, cause the processor 402 to perform various functions.

In one example, the instructions 406 may include instructions to receive a facial image. The instructions 408 may include instructions to analyze the facial image to calculate facial features. The instructions 410 may include instructions to access a database to obtain contextual information. The instructions 412 may include instructions to generate a vector comprising a facial feature class of the facial features and contextual feature classes of the contextual information. The instructions 414 may include instructions to perform the facial recognition based on the vector.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   receiving, by a processor, an image;
   analyzing, by the processor, the image to obtain facial features;
   obtaining, by the processor, contextual information;
   generating, by the processor, a vector comprising a facial feature class of the facial features and contextual feature classes of the contextual information;
   accessing, by the processor, dynamic contextual information stored in dynamic contextual information databases to update dynamic contextual information of the contextual feature classes that has changed for a respective vector of each image of a plurality of images in a database in response to a request to perform a facial recognition process, wherein the dynamic contextual information comprises calendar information and access event data, wherein the access event data includes an access card swipe or a log in of a remote device to an internet protocol address at a location;
   comparing, by the processor, the vector with the respective vector of each image of the plurality of images in the database that are updated; and
   detecting, by the processor, a matching image from the plurality of images in the database based on a highest score calculated from each matching feature between the vector and the respective vector of the matching image.

2. The method of claim 1, wherein the comparing comprises:
   filtering, by the processor, a plurality of images in a database into a subset of the plurality of images based on the contextual feature classes; and
   performing, by the processor, the facial recognition based on the facial feature class.

3. The method of claim 1, wherein the calendar information comprises a date, a meeting time, and a meeting location.

4. The method of claim 1, further comprising:
   updating, by the processor, at least one contextual feature class of the contextual feature classes that contain dynamic contextual features.

5. The method of claim 1, wherein the comparing further comprises:

applying, by the processor, a first weight value to the facial feature class and a second weight value to the contextual feature classes.

6. The method of claim 1, wherein the comparing comprises:
performing, by the processor, an iterative process, wherein a contextual feature class of the contextual feature classes is added, or removed, for each iteration based on feedback from a previous iteration.

7. The method of claim 1, comprising:
receiving, by the processor, a second image;
obtaining, by the processor, body features from the second image; and
generating, by the processor, a body feature class in the vector.

8. The method of claim 1, wherein the contextual information comprises at least one of: a calendar information, a location information, an organizational proximity, or an access event information.

9. A non-transitory computer readable storage medium encoded with instructions executable by a processor, the non-transitory computer-readable storage medium comprising:
instructions to receive a facial image;
instructions to analyze the facial image to calculate facial features;
instructions to access a database to obtain static contextual information and dynamic contextual information;
instructions to generate a vector comprising a facial feature class of the facial features and contextual feature classes of the static contextual information and the dynamic contextual information;
instructions to access the dynamic contextual information stored in dynamic contextual information databases to update the dynamic contextual information of the contextual feature classes that has changed for a respective vector of each image of a plurality of facial images in a gallery database in response to a request to perform a facial recognition process, wherein the dynamic contextual information comprises calendar information and access event data, wherein the access event data includes an access card swipe or a log in of a remote device to an internet protocol address at a location;
instructions to compare the vector with the respective vector of each facial image of the plurality of facial images in the gallery database that are updated; and
instructions to detect a matching facial image from the plurality of facial images in the gallery database based on a highest score calculated from each matching feature between the vector and the respective vector of the matching facial image.

10. The non-transitory computer readable storage medium of claim 9, wherein the instructions to compare further comprises:
instructions to filter a plurality of images in a database into a subset of the plurality of images based on the contextual feature classes; and
instructions to perform the facial recognition based on the facial feature class.

11. The non-transitory computer readable storage medium of claim 10, wherein an image of the subset of the plurality of images that matches the facial image is removed from the subset of the plurality of images for a subsequent performance of the facial recognition on a subsequent facial image.

12. An apparatus, comprising:
a camera to capture a facial image;
a first database to store a plurality of facial images;
a second database to contextual information; and
a processor communicatively coupled to the camera, the first database, and the second database, wherein the processor receives the facial image, calculates facial features from the facial image, obtains contextual information from the second database, generates a vector comprising a facial feature class of the facial features and contextual feature classes of the contextual information, accesses dynamic contextual information stored in dynamic contextual information databases to update dynamic contextual information of the contextual feature classes that has changed for a respective vector of each image of a plurality of facial images in a gallery database in response to a request to perform a facial recognition process, wherein the dynamic contextual information comprises calendar information and access event data, wherein the access event data includes an access card swipe or a log in of a remote device to an internet protocol address at a location, compares the vector with the respective vector of each facial image of the plurality of facial images in the gallery database that are updated, and detects a matching facial image from the plurality of facial images in the gallery database based on a highest score calculated from each matching feature between the vector and the respective vector of the matching facial image.

13. The apparatus of claim 12, wherein the camera comprises a red, green, blue (RGB) camera.

14. The apparatus of claim 12, further comprising:
a second camera comprising a depth sensing camera to capture a whole body image, wherein the whole body image is analyzed by the processor to obtain body features and generate a body feature class in the vector.

* * * * *